(12) United States Patent
Kujime (10) Patent No.: US 9,713,943 B2
(45) Date of Patent: Jul. 25, 2017

(54) PNEUMATIC TIRE

(71) Applicant: SUMITOMO RUBBER INDUSTRIES, LTD., Kobe-shi, Hyogo (JP)

(72) Inventor: Tomoyuki Kujime, Kobe (JP)

(73) Assignee: SUMITOMO RUBBER INDUSTRIES, LTD., Kobe-Shi, Hyogo (JP)

( * ) Notice: Subject to any disclaimer, the term of this patent is extended or adjusted under 35 U.S.C. 154(b) by 637 days.

(21) Appl. No.: 14/223,112

(22) Filed: Mar. 24, 2014

(65) Prior Publication Data

US 2014/0305563 A1    Oct. 16, 2014

(30) Foreign Application Priority Data

Apr. 15, 2013   (JP) ................. 2013-085076

(51) Int. Cl.
  *B60C 11/12*   (2006.01)
  *B60C 11/04*   (2006.01)
  *B60C 11/03*   (2006.01)

(52) U.S. Cl.
  CPC ...... *B60C 11/1236* (2013.01); *B60C 11/0304* (2013.04); *B60C 11/04* (2013.01); *B60C 11/1204* (2013.04); *B60C 2011/0358* (2013.04); *B60C 2011/0381* (2013.04); *B60C 2011/0383* (2013.04); *B60C 2011/0388* (2013.04);
  (Continued)

(58) Field of Classification Search
  CPC ............. B60C 11/1236; B60C 11/1204; B60C 2011/0358; B60C 2011/0374; B60C 2011/0381; B60C 2011/0386; B60C 2011/0388; B60C 2011/039; B60C 2011/1286; B60C 2011/129; B60C 2011/1295; B60C 2011/0372
  See application file for complete search history.

(56) References Cited

U.S. PATENT DOCUMENTS

| | | | |
|---|---|---|---|
| 2005/0183807 A1* | 8/2005 | Hildebrand | ......... B60C 11/0306 152/209.2 |
| 2010/0314012 A1* | 12/2010 | Hada | ................... B60C 11/0306 152/209.16 |
| 2015/0151588 A1* | 6/2015 | Munezawa | ............. B60C 11/04 152/209.25 |

FOREIGN PATENT DOCUMENTS

| | | |
|---|---|---|
| EP | 2397346 A1 | 12/2011 |
| JP | 10-100615 A | 4/1998 |

(Continued)

OTHER PUBLICATIONS

Extended European Search Report for European Application No. 14159712.0, dated Sep. 15, 2014.

*Primary Examiner* — Michael H Wilson
*Assistant Examiner* — Kendra Ly
(74) *Attorney, Agent, or Firm* — Birch, Stewart, Kolasch & Birch, LLP (57) ABSTRACT

A middle land portion includes middle sipes and middle lateral grooves. A shoulder land portion includes shoulder lateral grooves and shoulder sipes. A ratio Ems/Ema is smaller than a ratio Ess/Esa. Ems denotes a total of elements of edge lengths of the middle sipes in an axial direction of the tire. Ema denotes a total of elements of edge lengths of the middle sipes and the middle lateral grooves in the axial direction. Ess denotes a total of elements of edge lengths of the shoulder sipes in the axial direction. Esa denotes a total of elements of edge lengths of the shoulder sipes and the shoulder lateral grooves in the axial direction.

11 Claims, 6 Drawing Sheets

(52) U.S. Cl.
CPC . *B60C 2011/1209* (2013.04); *B60C 2011/129* (2013.04); *B60C 2011/1295* (2013.04)

(56) References Cited

FOREIGN PATENT DOCUMENTS

| | | |
|---|---|---|
| JP | 2010-30350 A | 2/2010 |
| WO | WO 2013/137193 A1 | 9/2013 |

\* cited by examiner

PNEUMATIC TIRE

BACKGROUND OF THE INVENTION

Field of the Invention

The present invention relates to a pneumatic tire, and in particular to a pneumatic tire that may exhibit better wear resistance.

Description of the Related Art

In order to improve the wear resistance of tires, measures have been carried out such as increasing the content of butadiene rubber (BR) in tread rubber and employing a design to increase the depth of grooves in a tread pattern. However, the tires of increased content of butadiene rubber in the tread rubber, in general, are deteriorated in the wet grip performance. The tires with increased depth of grooves may improve the drainage performance but can deteriorate the rigidity of the tread portion, which adversely affects the steering stability of the tire.

Japanese Unexamined Patent Application Publication No. 10-100615 proposes a pneumatic tire including a tread portion with a pair of shoulder portions. Each of the shoulder portions is divided by a sub groove into an axially inner land portion and an axially outer land portion to restrain partial wear such as heel-and-toe wear of the tire without deterioration of the wet performance. The outer land portion is further divided by a lateral grooves and the inner land portion is formed as a rib that continuously extends in the circumferential direction.

SUMMARY OF THE INVENTION

The present invention has a main object of providing a pneumatic tire that may exhibit better wear resistance while maintaining wet performance and steering stability. According to one aspect of the present invention, a pneumatic tire comprises a tread portion being provided with a pair of circumferentially and continuously extending crown main grooves each disposed on both sides of a tire equator, and a pair of circumferentially and continuously extending shoulder main grooves each disposed axially outside the crown main groove, to form a crown land portion disposed between the pair of crown main grooves, a pair of middle land portions each disposed between the crown main groove and the shoulder main groove on each side of the tire equator, and a pair of shoulder land portions each disposed axially outside the shoulder main groove. The crown land portion is provided with a plurality of crown lateral grooves each extending from the crown main groove toward the tire equator without entirely passing through the crown land portion. Each of the middle land portions is provided with a plurality of middle sipes each extending from the shoulder main groove toward the crown main groove, and a plurality of middle lateral grooves each arranged between the circumferentially adjacent middle sipes and extending from the shoulder main groove toward the crown main groove without entirely passing through the middle land portion. Each of the shoulder land portions is provided with a plurality of shoulder lateral grooves each extending axially inward from a tread edge without entirely passing through the shoulder land portion, and a plurality of shoulder sipes each arranged between the circumferentially adjacent shoulder lateral grooves. A ratio Ems/Ema is set smaller than a ratio Ess/Esa, wherein Ems denotes a total of elements of edge lengths of the middle sipes in an axial direction of the tire, Ema denotes a total of elements of edge lengths of the middle sipes and the middle lateral grooves in the axial direction, Ess denotes a total of elements of edge lengths of the shoulder sipes in the axial direction, and Esa denotes a total of elements of edge lengths of the shoulder sipes and the shoulder lateral grooves in the axial direction.

In another aspect of the present invention, each of the middle sipes and the shoulder sipes may have an arc-shape.

In another aspect of the present invention, each angle of the middle sipes and the shoulder sipes with respect to a circumferential direction of the tire gradually may increase toward its axially outer end from its axially inner end.

In another aspect of the present invention, one of the shoulder land portions may be further provided with a plurality of shoulder auxiliary sipes each communicating between an axially inner end of the shoulder lateral groove and the shoulder main groove.

In another aspect of the present invention, one of the middle land portions may further be provided with at least two middle sipes arranged between the circumferentially adjacent middle lateral grooves.

In another aspect of the present invention, a sipe may be absent in the crown land portion.

In another aspect of the present invention, the middle sipes may comprise a first middle sipe extending entirely across the middle land portion, and a second middle sipe extending without entirely across the middle land portion.

In another aspect of the present invention, a total edge length of the middle sipes and shoulder sipes may be set in a range of from 40% to 70% of a total edge length of the pair of crown main grooves, the pair of shoulder main grooves, the crown lateral grooves, the middle lateral grooves, the shoulder lateral grooves, the middle sipes, and the shoulder sipes.

In another aspect of the present invention, a number of the middle lateral grooves in each middle land portion may be set in a range of from 56 to 72, and a number of the shoulder lateral grooves in each shoulder land portion may be set in a range of from 56 to 72.

In another aspect of the present invention, a number of the shoulder lateral grooves in each shoulder land portion may be set smaller than a number of the middle lateral grooves in each middle land portion.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings, wherein.

DESCRIPTION OF THE EMBODIMENTS

Figure 1:
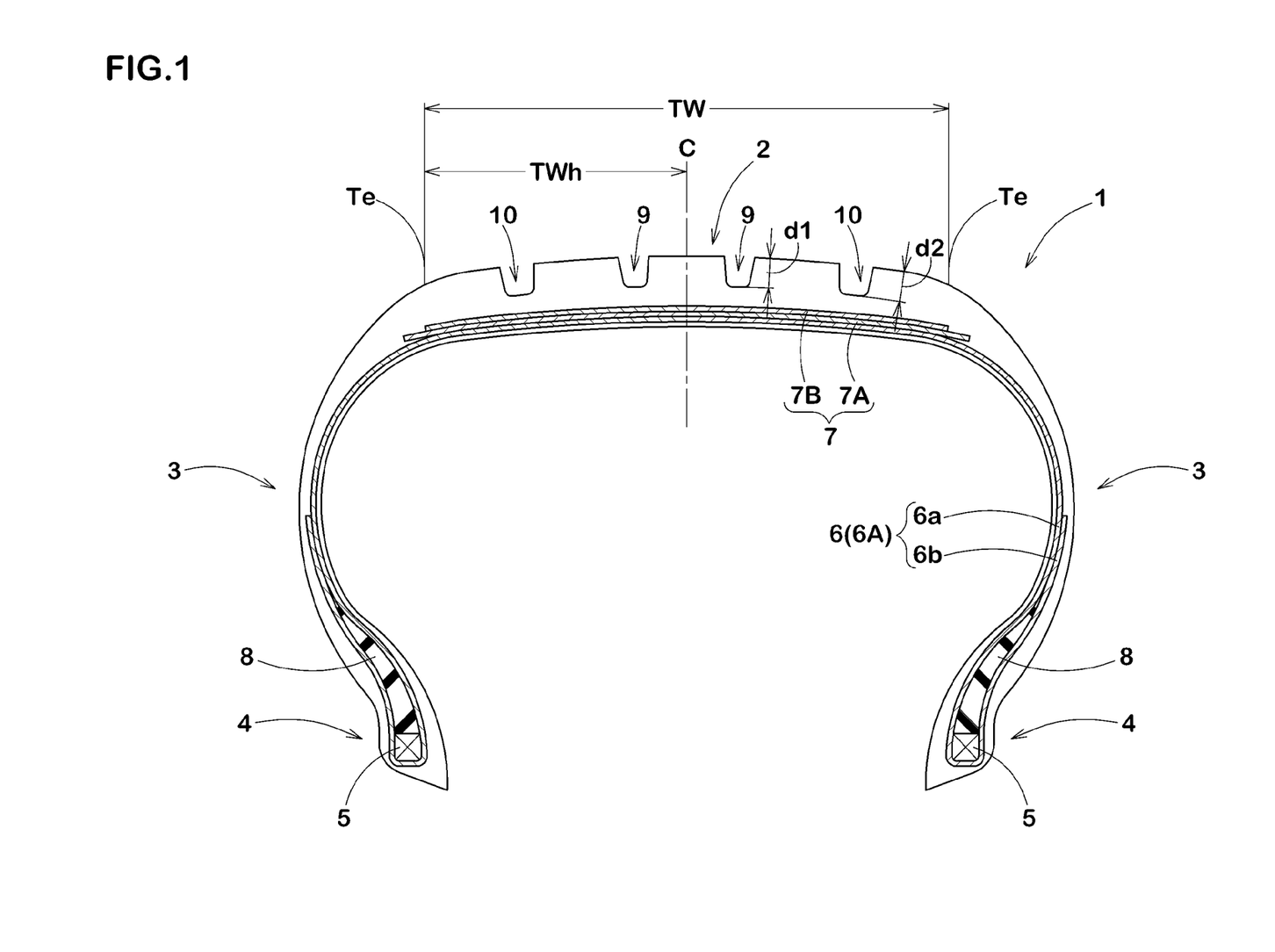
FIG. 1 is a cross-sectional view of a pneumatic tire according to an embodiment.

An embodiment of the present invention will be described below referring to the drawings. FIG. 1 is a meridian cross-sectional view of a pneumatic tire 1 under a normally inflated unloaded condition according to the embodiment. The "normally inflated unloaded condition" is such that a tire is mounted on a standard wheel rim (not shown) and inflated to a standard pressure but loaded no tire load. In this application including specification and claims, various dimensions, positions and the like of the tire refer to those under the normally inflated unloaded condition of the tire unless otherwise noted.

The standard wheel rim means a wheel rim officially approved or recommended for the tire by standards organizations, the standard wheel rim is the "standard rim" specified in JATMA, the "Measuring Rim" in ETRTO, and the "Design Rim" in TRA or the like, for example.

The standard pressure means the "maximum air pressure" in JATMA, the "Inflation Pressure" in ETRTO, and the maximum pressure given in the "Tire Load Limits at various Cold Inflation Pressures" table in TRA or the like.

As shown in FIG. 1, the pneumatic tire (which will be occasionally referred to simply as "tire") according to the embodiment of the present invention includes a carcass 6 and a belt layer 7. The carcass 6 extends between bead cores 5 each disposed in a bead portion 4 through a pair of sidewall portions 3. The belt layer 7 is disposed radially outside the carcass 6 in the tread portion 2. The tire 1 according to the present embodiment is used for passenger vehicles.

The carcass 6 includes a single carcass ply 6A of carcass cords. The carcass ply 6A includes a main portion 6a and a pair of turn-up portions 6b and 6b. The main portion 6a extends between the bead cores 5 and 5, and each turn-up portion 6b is turned up around the bead core 5 from the axially inside to the outside of the tire. The carcass cords are arranged at angle in a range of from 70 to 90 degrees with respect to a tire equator C, for example. As the carcass cord of the carcass ply 6A, an organic fiber code such as, for example, aromatic polyamide and rayon is used. A bead apex rubber 8 that tapers and extends radially outward the tire from the bead core 5 is disposed between the main portion 6a and the turn-up portion 6b of the carcass ply 6A.

The belt layer 7 includes two belt plies 7A and 7B of belt cords. The belt plies 7A and 7B are overlapped so that the belt cords of each ply cross with each other. The belt cords are laid at angle in a range of from 15 to 45 degrees with respect to the tire equator C. For the belt cord, steel, aramid or rayon may be used.

Figure 2:
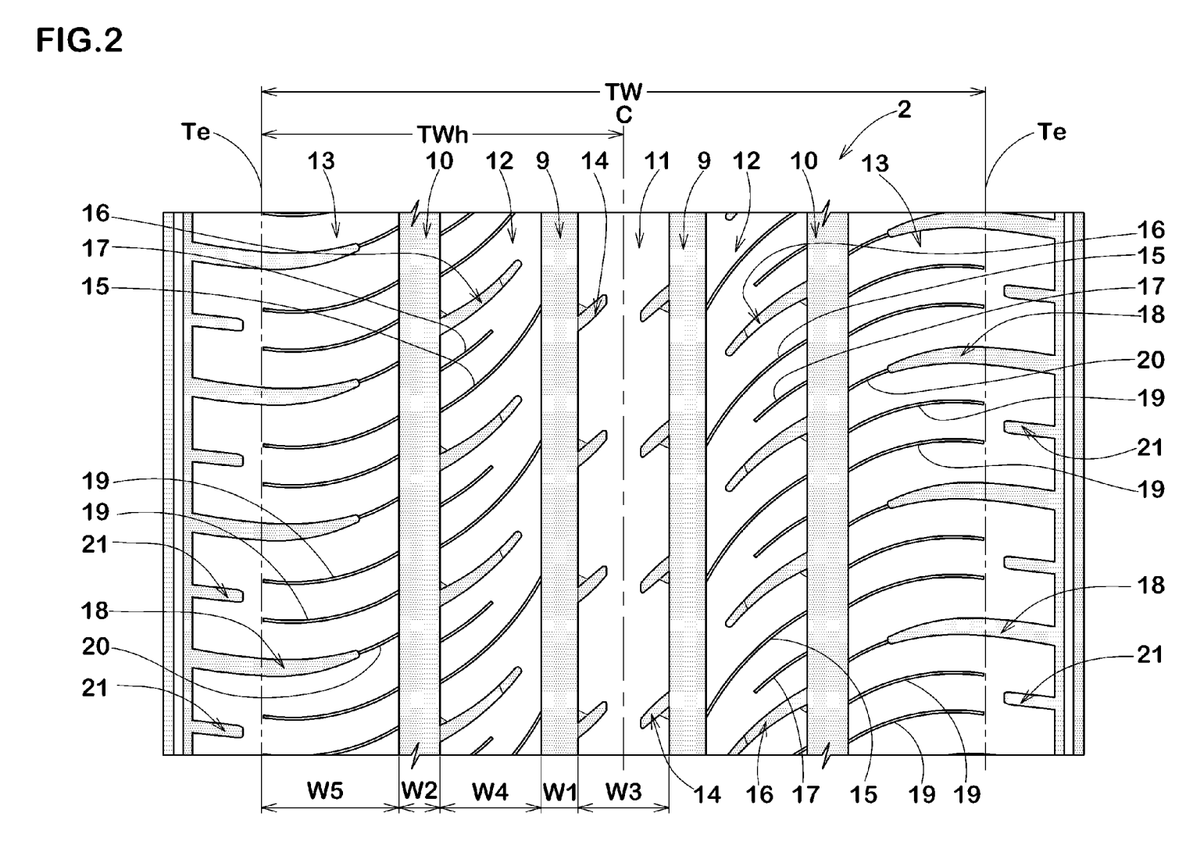
FIG. 2 is a developed view of a tread portion shown in FIG. 1.

FIG. 2 is a developed view of the tread portion 2 of the pneumatic tire according to the embodiment. As shown in FIG. 2, the tread portion 2 is provided with a plurality of circumferentially and continuously extending main grooves that include a pair of crown main grooves 9 and 9, and a pair of shoulder main grooves 10 and 10. The pair of crown main grooves 9 are disposed on both sides of the tire equator C. Each shoulder main groove 10 is disposed axially outside each crown main groove 9.

The tread portion 2 is divided into a plurality of land portions by the crown main grooves 9 and 9 and the shoulder main grooves 10 and 10. The land portions of the tread portion 2 include a crown land portion 11, a pair of middle land portions 12 and 12, and a pair of shoulder land portions 13 and 13. The crown land portion 11 is disposed between the pair of crown main grooves 9 and 9. Each of the middle land portions 12 is disposed between the crown main groove 9 and shoulder main groove 10 on each side of the tire equator C. Each of the shoulder land portions 13 is disposed axially outside of each shoulder main groove 10.

Preferably, the tread portion 2 has a land ratio in a range of not less than 64%, more preferably not less than 66%, but preferably not more than 72%, more preferably not more than 70%. This provides well balanced dry performance and wet performance. It should be noted that the "land ratio" indicates the ratio of an area to be actually landed with respect to an entire area of an imaginary surface with the grooves all filled, between two tread edges Te and Te.

The "tread edge" Te indicates an axially outermost ground contact end of the tire under a normal inflated loaded condition. The normally inflated loaded condition is such that a tire is mounted on the standard wheel rim with a camber angle of zero and inflated to a standard pressure and loaded with a standard tire load. The standard tire load is the "maximum load capacity" in JATMA, the "Load Capacity" in ETRTO, and the maximum value given in the above-mentioned table in TRA or the like.

In this embodiment, the crown main grooves 9 and 9 straightly extend along the circumferential direction of the tire to efficiently remove the water from under the tread portion 2 around the tire equator C during wet traveling. Each of the crown main grooves 9 may extend in a zigzag or wavy manner.

Each crown main groove 9 has a groove width w1. When the crown main groove 9 has a small width w1, the drainage performance of the tire is likely to deteriorate. With a large width w1, the dry grip performance of the tire is likely to deteriorate. From this point of view, the groove width w1 is preferably 9% or higher and more preferably 10% or higher, and is preferably 13% or lower and more preferably 12% or lower of a tread half-width Twh. The tread half-width is an axial distance from the tire equator C to one of the tread edges Te. The groove width w1 of the tire for passenger vehicles in this embodiment is preferably in a range of from 8 mm to 12 mm. From the same point of view, a groove depth d1 of the crown main groove 9 is preferably in a range of from 7 mm to 9 mm.

The shoulder main grooves 10 and 10 straightly extend along the circumferential direction of the tire similarly to the crown main grooves 9 and 9. The shoulder main grooves 10 and 10 each may extend in a zigzag or wavy manner.

Each shoulder main groove 10 has a groove width w2. When the shoulder main grooves 10 have a small width w2, the drainage performance of the tire is likely to deteriorate. With a large width w2, the ground contact area of the middle land portions 12 and 12 and the shoulder land portions 13 and 13 is likely to diminish. This might deteriorate the steering stability of a vehicle in particular. From this point of view, the groove width w2 is preferably 10% or higher and more preferably 11% or higher, and is preferably 14% or lower and more preferably 13% or lower of the tread half-width Twh. From the similar point of view, the groove depth d2 of the shoulder main grooves 10 and 10 is preferably in a range of from 7 mm to 9 mm. In particular, the groove width w2 is preferably larger than the groove width w1 of the crown main grooves 9 and 9.

Figure 3:
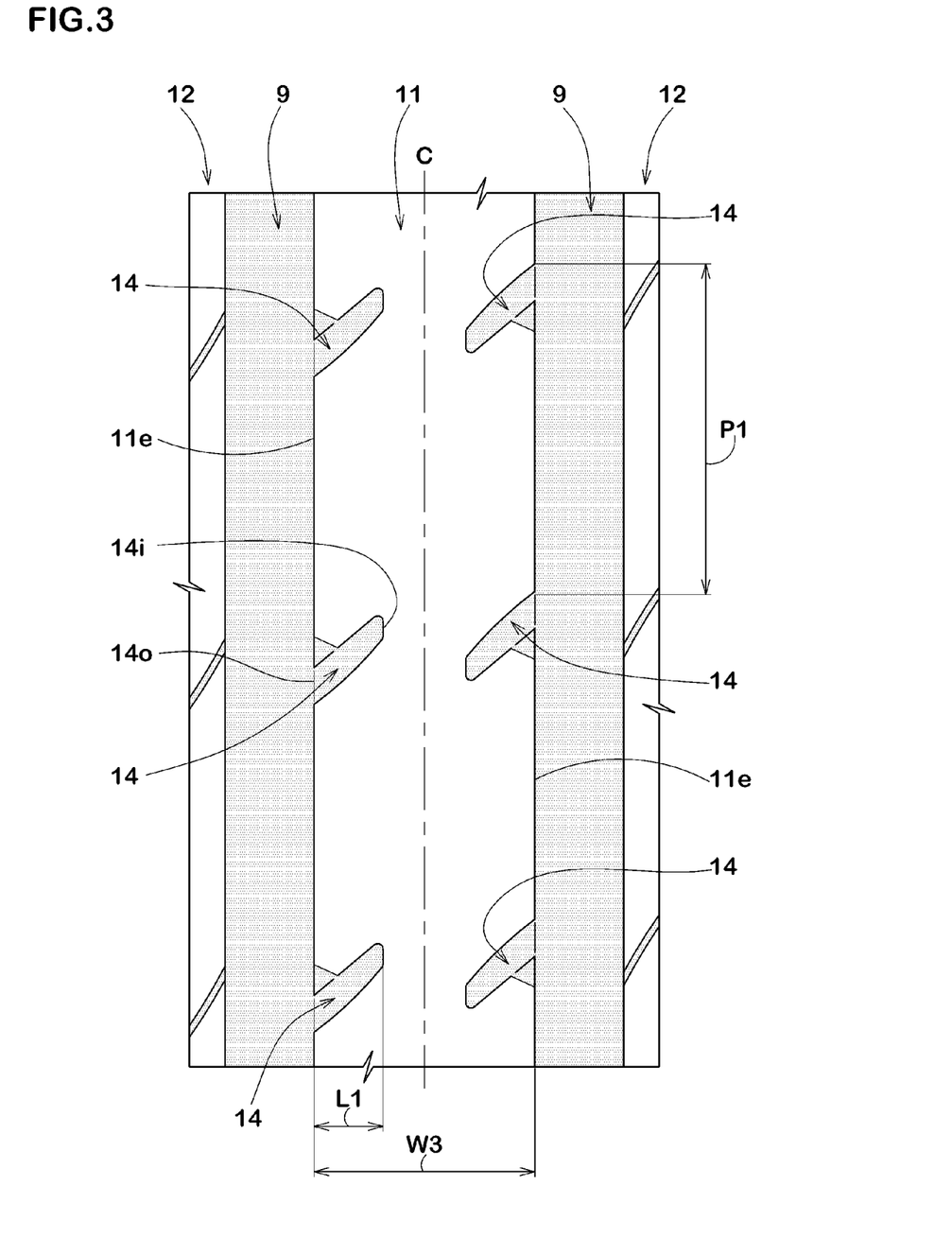
FIG. 3 is an enlarged developed view of a crown land portion shown in FIG. 2.

FIG. 3 illustrates a developed view of the crown land portion 11. As shown in FIG. 3, the crown land portion 11 is disposed between the pair of crown main grooves 9 and 9, and continuously extends in the circumferential direction of the tire on the tire equator C.

The crown land portion 11 has an axial width w3 between its side edges 11e and 11e of the ground contact surface. When the crown land portion 11 has a small width w3, the dry grip performance and the wear resistance of the tire are likely to deteriorate. With a large width w3, the wet performance of the tire is likely to deteriorate. From such a point of view, the width w3 is preferably 22% or higher and more preferably 24% or higher, and is preferably 28% or lower and more preferably 26% or lower of the tread half-width Twh.

The crown 1 and portion 11 is preferably provided with a plurality of crown lateral grooves 14. The crown lateral grooves 14 obliquely extend from both crown main grooves 9 and 9 toward the tire equator C. This may improve wet performance of the tire.

Each crown lateral groove 14 has an axially outer end 14o and an inner end 14i. The outer end 14o is communicated with one of the crown main grooves 9, and the inner end 14i preferably terminates so as not to communicate with the other crown main groove 9. Specifically, the crown lateral groove 14 has a configuration that is not entirely across the crown land portion 11 in an axial direction of the tire. In this embodiment, the crown land portion 11 includes no sipes. The crown land portion 11 with no sipes may properly retain the rigidity of the crown land portion 11 with an improvement of the wet performance, thereby enhancing the steering stability and the wear resistance of the tire. No sipes are included in the crown land portion 11 in this embodiment, but some sipes may be provided between the two adjacent crown lateral grooves 14 and 14, if necessary.

Each crown lateral grooves 14 has a groove length L1 in the axial direction of the tire. When the crown lateral grooves 14 has a small groove length L1, the wet performance is less likely to improve. With a large groove length L1, the rigidity of the crown land portion 11 is likely to deteriorate. This makes the steering stability and the wear resistance of the tire more likely to deteriorate. From this point of view, the groove length L1 is preferably 6% or higher and more preferably 7% or higher, and is preferably 11% or lower and more preferably 10% or lower of the tread half-width Twh. From the same point of view, the groove width of the crown lateral grooves 14 is preferably 2.5 mm to 3.5 mm, and the groove depth of the crown lateral grooves 14 is preferably in a range of from 4.5 mm to 6.5 mm.

A placement pitch P1 is provided between the adjacent crown lateral grooves 14 and 14. With a small placement pitch P1, the rigidity of the crown land portion 11 is likely to deteriorate. This makes partial wear of the tire more likely to occur. With a large placement pitch P1, the wet performance is less likely to improve. From such a point of view, the placement pitch P1 is preferably 3% or higher and more preferably 4% or higher, and is preferably 7% or lower and more preferably 6% or lower of the tire diameter.

Figure 4:
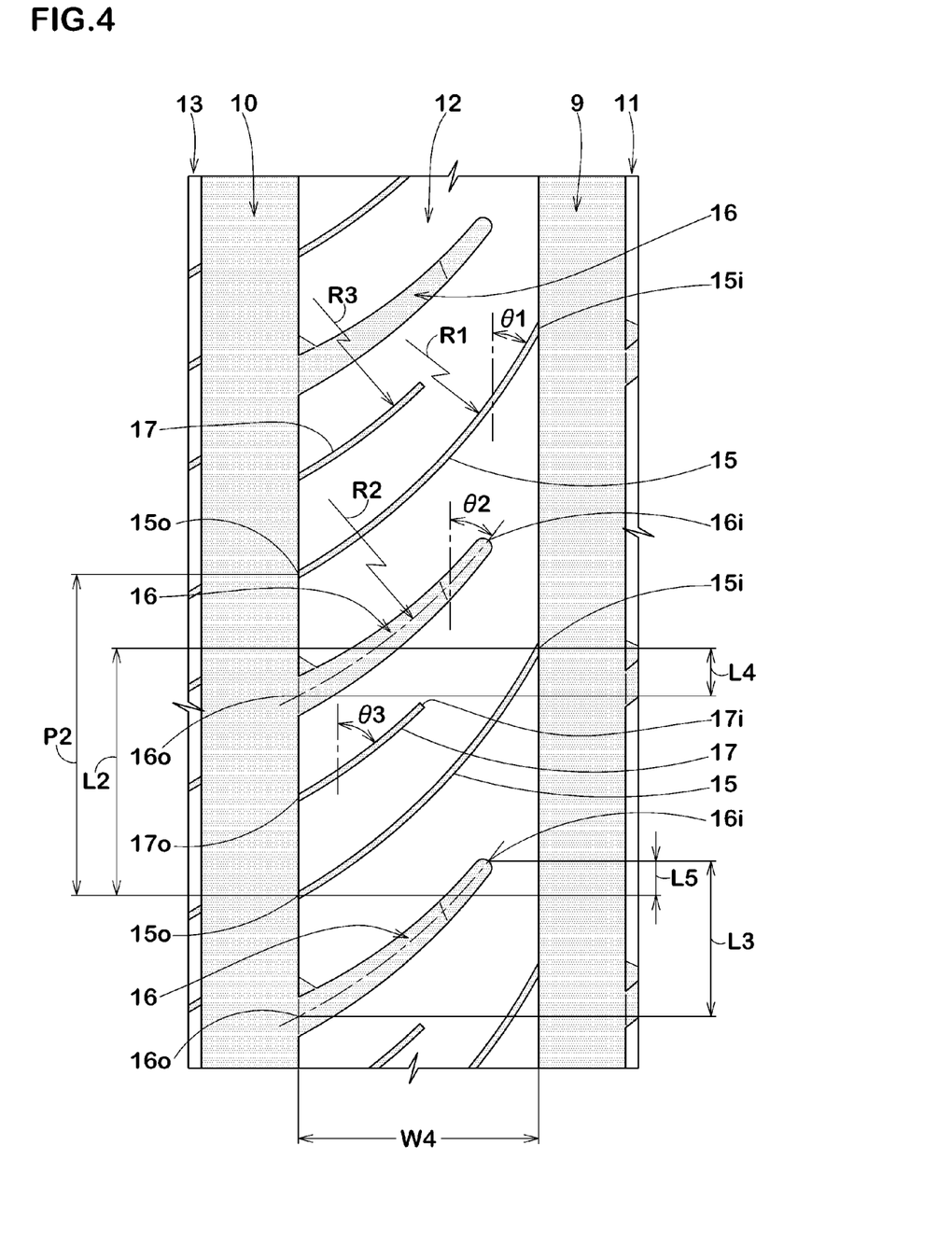
FIG. 4 is an enlarged developed view of a middle land portion shown in FIG. 2.

FIG. 4 illustrates a developed view of the middle land portion 12. As shown in FIG. 4, the middle land portion 12 is provided with a plurality of first middle sipes 15, a plurality of middle lateral grooves 16, and a plurality of second middle sipes 17.

The middle land portion 12 has a width w4. The width w4 is preferably longer than the width w3 of the crown land portion 11. This optimizes the ground contact pressures of the crown land portion 11 and the middle land portion 12, thereby restraining the partial wear of the tire. When the middle land portion 12 has a small width w4, the dry grip performance and the wear resistance of the tire are likely to deteriorate. With a large width w4, the wet performance of the tire is likely to deteriorate. From such a point of view, the width w4 of the middle land portion 12 is preferably 24% or higher and more preferably 26% or higher, and is preferably 32% or lower and more preferably 30% or lower of the tread half-width Twh. For the tire for passenger vehicles according to the embodiment, the width w4 of the middle land portion 12 is preferably in a range of from 20 mm to 25 mm.

Each first middle sipes 15 has an axially inner end 15i and an outer end 15o. The inner end 15i communicates with the crown main groove 9, and the outer end 15o communicates with the shoulder main groove 10. The first middle sipe 15 having such a configuration may remove the water remaining between the tread portion 2 and a road surface axially outward during a wet traveling, thereby improving the wet performance of the tire. In order to balance the rigidity and the drainage capability of the middle land portion 12, the sipe width of the first middle sipes 15 is preferably, for example, in a range of from 0.6 mm to 1.0 mm, and the sipe-depth of the first middle sipes 15 is preferably, for example, in a range of from 2.0 mm to 3.0 mm.

Each first middle sipe 15 extends from the inner end 15i to the outer end 15o, and the angle $\theta 1$ of the first middle sipes 15 with respect to the circumferential direction of the tire is gradually increased so as to form an arc shape. In such a configuration, the angle $\theta 1$ of the first middles sipes 15 at a side of the crown main groove 9, to which a relatively large ground contact pressure is applied during a straight forward traveling of a vehicle, is small and thus the rigidity of the middle land portion 12 in the circumferential direction of the tire is properly retained. On the other hand, the angle $\theta 1$ at a side of the shoulder main groove 10, to which a relatively large ground contact pressure is applied during a turn of a vehicle, is large and thus the rigidity of the middle land portion 12 in the axial direction is properly retained. Therefore, the middle land portion 12 is provided with satisfactory rigidity, which improves the steering stability and the wear resistance of the tire. In addition, the first middle sipes 15 of an arc shape is better than that of a straight forward configuration because the arc shape can have a longer edge length.

When the first middle sipes 15 have a small angle $\theta 1$, the drainage performance is likely to deteriorate. With a large angle $\theta 1$, the rigidity of the middle land portion 12 in the circumferential direction of the tire is likely to deteriorate. From this point of view, the angle $\theta 1$ of the first middle sipes 15 at the inner end 15i is preferably in a range of from 30 to 40 degrees, and at the outer end 15o, preferably in a range of from 55 to 65 degrees.

The developed view of FIG. 2 illustrates a radius of curvature R1. The curvature R1 represents the degree of curvature of the first middle sipes 15. When the first middle sipes 15 have a small curvature R1, the rigidity in the tire circumferential direction of the middle land portions 12 and 12 is likely to significantly deteriorate. With a large curvature R1, it is possible that the edge effect is insufficient. From such a point of view, the radius of curvature R1 is preferably 30 mm or larger and more preferably 50 mm or larger, and is preferably 90 mm or smaller and more preferably 70 mm or smaller.

Each first middle sipe 15 has a length L2 between the outer end 15o to the inner end 15i in the circumferential direction of the tire. The length L2 is set in a range of from 0.6 to 1.0 times a placement pitch P2 of the first middle sipes 15. This provides a high level of balance between the rigidity and the drainage performance of the middle land portions 12 and 12. This, in turn, improves the steering stability and the wear resistance as well as the wet performance of the tire. The first middle sipes 15 with the tire-circumferential length L2 smaller than the value of 0.6 times the placement pitch P2 decreases the wet performance, and the first middle sipes 15 with the length L2 larger than the value of 1.0 times the placement pitch P2 reduces the steering stability and the wear resistance of the tire. The placement pitch P2 is preferably set in a range of from 3% to 7% of the outer diameter of the tire.

Each of the middle lateral grooves 16 is disposed between adjacent first middle sipes 15 and 15 in the tire circumferential direction and is obliquely elongate with respect to the circumferential direction of the tire while avoiding crossing the first middle sipes 15. Each middle lateral groove 16 has an axially outer end 16o and an inner end 16i. The outer end 16o communicates with the shoulder main groove 10 and inner end 16i terminates so as not to communicate with the crown main groove 9. Specifically, the middle lateral grooves 16 are not entirely passed through the middle land portion 12 in the axial direction. The middle lateral grooves 16 having such a configuration retain the rigidity of the middle land portion 12 and improve the wet performance. This, in turn, enhances the steering stability and the wear resistance of the tire.

Each middle lateral groove 16 extends from the inner end 16i to the outer end 16o, and the angle θ2 of each middle lateral groove 16 with respect to the circumferential direction of the tire is gradually increased to form an arc shape. The middle lateral grooves 16 with such a configuration improves, similarly to the first middle sipes 15, the steering stability and the wear resistance as well as the wet performance of the tire. The angle θ2 is preferably set in a range of from 40 to 60 degrees in order to properly balance the rigidity and the drainage capability of the middle land portion 12. From the same point of view, the groove width of the middle lateral grooves 16 is preferably, for example, in a range of from 2.0 mm to 4.0 mm, and the groove depth thereof is preferably, for example, in a range of from 4.0 mm to 7.0 mm.

The developed view of FIG. 2 illustrates a radius of curvature R2. The curvature R2 represents the degree of curvature of the middle lateral grooves 16. When the middle lateral grooves 16 have a small radius of curvature R2, the drainage performance of the tire is likely to deteriorate. With a large radius of curvature R2, the edge effect of the tire is likely to deteriorate. From such a point of view, the radius of curvature R2 is preferably 25 mm or larger and more preferably 45 mm or larger, and is preferably 75 mm or smaller and more preferably 55 mm or smaller.

Each middle lateral groove 16 has a length L3 in the tire circumferential direction between the outer end 16o and the inner end 16i, which length L3 is set to be smaller than the tire-circumferential length L2 of the first middle sipes 15. With this configuration, the middle lateral grooves 16 are less affected in the rigidity thereof, and thus the rigidity of the middle land portion 12 is properly retained.

The middle lateral grooves 16 are small in the length L3, the wet performance is less likely to improve. With a large length L3, the rigidity of the middle land portions 12 and 12 is likely to deteriorate. This makes partial wear of the tire more likely to occur. From such a point of view, the length L3 is preferably 50% or higher and more preferably 60% or higher, and is preferably 80% or lower and more preferably 70% or lower of the placement pitch P2 of the first middle sipes 15.

The first middle sipes 15 are adjacent with the respective middle lateral grooves 16 in the tire circumferential direction, and overlap with one another in the axial direction. The overlapped first middle sipes 15 and the middle lateral grooves 16 further improve the wet performance of the tire.

When the overlapped area of the first middle sipes 15 and the middle lateral groove 16 is small, a sufficiently improved wet performance is less likely. When the overlapped area is large, the rigidity of the middle land portion 12 is likely to deteriorate. From this point of view, an overlapped distance L4 between the inner end 15i of the first middle sipes 15 and the outer end 16o of the middle lateral grooves 16 in the circumferential direction of the tire is preferably 8% or higher and more preferably 10% or higher, and is preferably 15% or lower and more preferably 13% or lower of the placement pitch P2 of the first middle sipes 15. Moreover, an overlapped distance L5 between the outer end 15o of the first middle sipes 15 and the inner end 16i of the middle lateral grooves 16 in the circumferential direction of the tire is preferably 8% or higher and more preferably 10% or higher, and is preferably 15% or lower and more preferably 13% or lower of the placement pitch P2 of the first middle sipes 15.

Each of the middle land portions 12 is preferably provided with second middle sipes 17 between the respective first middle sipes 15 and the middle lateral groove 16 that are adjacent with each other in the circumferential direction of the tire. The second middle sipes 17 of such a configuration can uniformize the rigidity of the middle land portion 12 and enhance the drainage performance of the first middle sipes 15 and the middle lateral grooves 16. In order to uniformize the rigidity of the middle land portion 12, the second middle sipes 17 are preferably provided with a sipe width of, for example, in a range of from 0.6 mm to 1.0 mm and a sipe-depth of, for example, in a range of from 2.0 mm to 3.0 mm.

Each second middle sipe 17 has an axially outer end 17o and an inner end 17i. The outer end 17o is preferably communicated with the shoulder main groove 10, while the inner end 17i preferably terminates at a position axially outer side of the inner end 16i of the middle lateral grooves 16. Specifically, the second middle sipes 17 are not entirely passed through the respective middle land portion 12 in the axial direction of the tire. The second middle sipes 17 having such a configuration improves the drainage performance of the tire without severe deterioration of the rigidity of the middle land portion 12 at a side of the tire equator C.

The second middle sipes 17 preferably extend from the inner end 17i to the outer end 17o, and the angle θ3 of the second middle sipes 17 with respect to the circumferential direction of the tire is gradually increased to form an arc shape. The second middle sipes 17 in this embodiment extend along the first middle sipes 15. With this second middle sipes 17, the middle land portions 12 and 12 improve in rigidity in the axial direction of the tire on the axially outer sides. This may enhance the steering stability of the tire. The angle θ3 is preferably in a range of from 45 to 70 degrees in consideration of the rigidity and the drainage capability of the middle land portion 12.

When the second middle sipes 17 have a small radius of curvature R3, the drainage performance of the tire is likely to deteriorate. With a large radius of curvature R3, the edge effect of the tire is likely to deteriorate. From such a point of view, the radius of curvature R3 is preferably 30 mm or larger and more preferably 50 mm or larger, and is preferably 90 mm or smaller and more preferably 70 mm or smaller.

The middle 1 and portion 12 is provided with a plurality of middle block portions in the tire circumferential direction. The middle block portions are sectioned by the middle lateral grooves 16 that are adjacent with one another in the tire circumferential direction. At least one of the middle block portions is preferably provided with at least one first middle sipe 15 or one second middle sipe 17, and more preferably provided with at least one middle sipe and one middle auxiliary sipe. Preferably, 70% or more and more preferably 80% or more of the plurality of middle block portions each are preferably provided with at least one first middle sipe 15 and one second middle sipe 17.

The first middle sipes 15, the middle lateral grooves 16 and the second middle sipes 17 are preferably inclined and projected in the same direction so as to form an arc shape, as shown in this embodiment. Such a configuration uniformizes the rigidity of the middle land portion 12, improves the steering stability, and restrains partial wear. It should be noted that the first middle sipes 15 or the second middle sipes 17 in the middle land portion 12 may be excluded.

Figure 5:
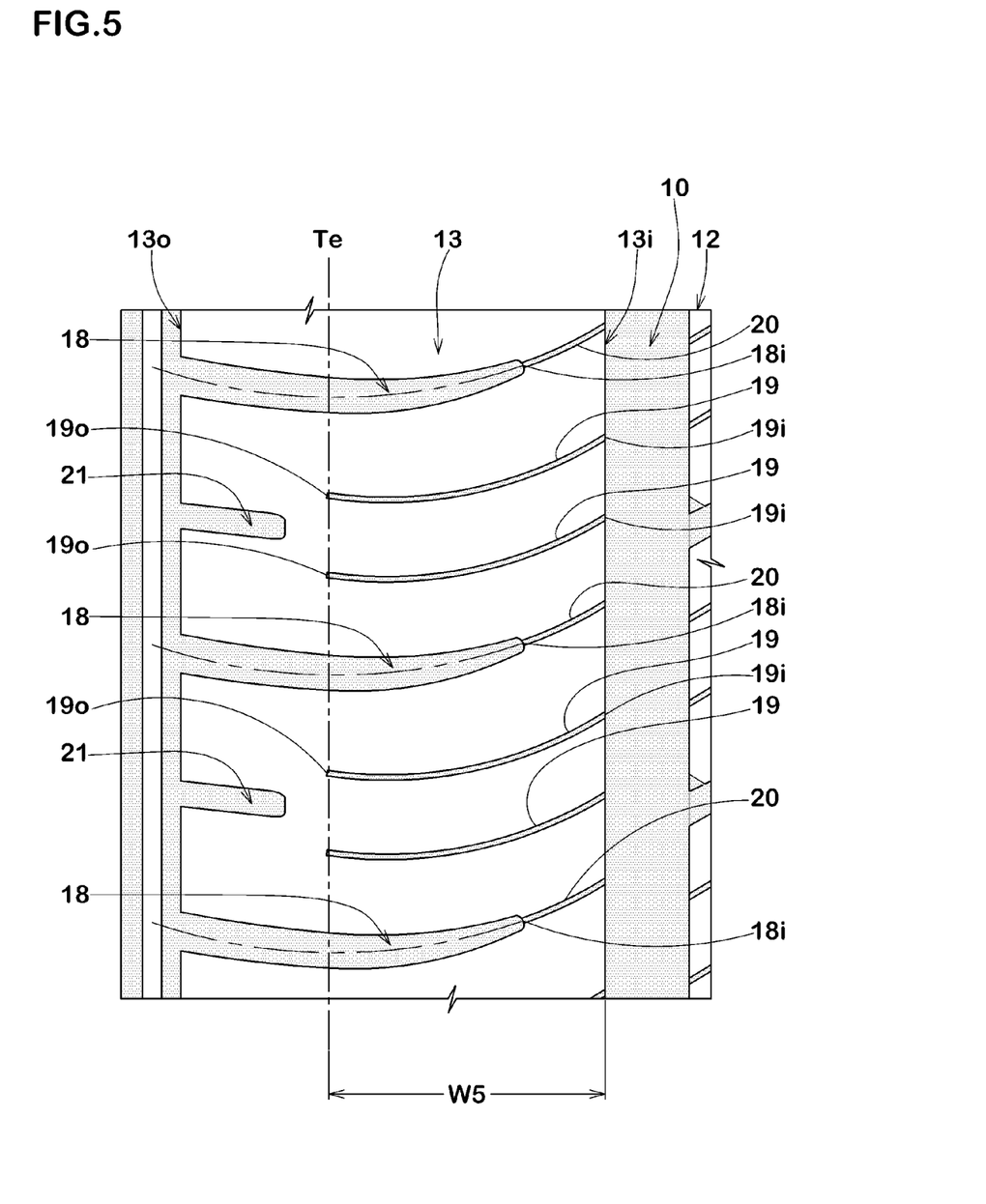
FIG. 5 is an enlarged developed view of a shoulder land portion shown in FIG. 2.

FIG. 5 illustrates a developed view of the shoulder land portion 13. As shown in FIG. 5, the shoulder land portion 13 includes shoulder lateral grooves 18. The shoulder lateral grooves 18 are separately disposed in the circumferential direction of the tire. Shoulder sipes 19 are provided between the respective shoulder lateral grooves 18 and 18 that are adjacent with each other in the tire circumferential direction.

The shoulder land portion 13 has a width w5. The width w5 is preferably wider than the width w4 of the middle land portion 12. Such a configuration optimizes the ground contact pressure of the middle land portion 12 and the shoulder land portion 13. This eliminates or minimizes partial wear of the tire. When the shoulder land portions 13 have a small width w5, the steering stability and the wear resistance of the tire are likely to deteriorate. With a large width w5, the wet performance of the tire is likely to deteriorate. From this point of view, the width w5 of the shoulder land portion 13 is preferably 44% or higher and more preferably 46% or higher, and is preferably 52% or lower and more preferably 50% or lower of the tread half-width Twh.

The shoulder lateral grooves 18 preferably extend axially inward from at least the tread edge Te, and more preferably extends axially inward from an axially outside of the tread edge Te. This can reduce the rigidity of the axially outer side of the shoulder land portion 13 relative to the axially inner side thereof, which improves the wandering performance of the tire.

The shoulder lateral grooves 18 terminates so as not to communicate with the shoulder main groove 10. Specifically, each shoulder lateral groove 18 preferably has an inner end 18i that is not entirely passed through the shoulder land portion 13 in the axial direction. This retains the rigidity in the axial direction of the inner side of the shoulder land portion 13, which improves the steering stability during a turn of a vehicle in particular. From the same point of view, the groove width of the shoulder lateral grooves 18 is preferably, for example, in a range of from 2.0 mm to 5.0 mm, and the groove-depth thereof is preferably, for example, in a range of from 4.0 mm to 7.0 mm.

The shoulder lateral grooves 18 are preferably projected in the same direction of the middle lateral grooves 16 of the adjacent middle land portion 12 so as to form an arc shape. Such a configuration uniformizes the rigidity of the middle land portion 12 and the shoulder land portion 13. This eliminates or minimizes partial wear of the tire.

Shoulder auxillary sipes 20 are preferably provided between inner ends 18i of the shoulder lateral grooves and axially inner end edges 13i of the shoulder land portion 13 so as to communicate with both the inner ends 18i and the end edges 13i. This retains the rigidity of the shoulder land portion 13, and improves the drainage performance of the shoulder main groove 10. This, in turn, improves the wet performance without deterioration of the steering stability and the wear resistance of the tire.

Each shoulder sipes 19 has an axially inner end 19i. The axially inner end 19i is preferably communicated with the shoulder main groove 10. This further improves the drainage performance of the shoulder main groove 10. Each shoulder sipe 19 has an axially outer end 19o. The axially outer end 19o is preferably positioned at least on the tread edge Te, and more preferably communicated with an axially outer end edge 13o of the shoulder land portion 13. With this configuration, water remaining between the shoulder land portion 13 and the road surface is efficiently discharged axially outward during wet traveling, resulting in improved wet performance of the tire.

The shoulder land portion 13 is provided with a plurality of shoulder block potions. Each of the plurality of shoulder block potions is sectioned by shoulder lateral grooves 18 adjacent with each other in the tire circumferential direction. At least one shoulder block portion is preferably provided with at least one shoulder sipe and more preferably with at least two shoulder sipes. Preferably, 70% or more and more preferably 80% or more of the shoulder block portions each are provided with at least two shoulder sipes 19. This configuration further improves the wet performance owing to the combination of the water absorption effect by the sipes and the edge effect of the end edges of the sipes.

Each of the shoulder sipes 19 preferably extends in the form of an arc shape and more preferably projected in the same direction of the first middle sipes 15 so as to form an arc shape. With such a configuration, the shoulder sipes 19 and the first middle sipes 15 together provide such an edge effect that generates a friction force in the axial direction. This improves the turning performance of the tire during a wet traveling. A radius of curvature R4 that represents the degree of curvature of the shoulder sipes 19 is preferably smaller than the radius of curvature R1 of the first middle sipes 15. This further improves the edge effect of the shoulder land portion 13.

When the shoulder sipes 19 have a small radius of curvature R4, the wet performance is likely to deteriorate. With a large radius of curvature R4, the steering stability of the tire is likely to deteriorate. From this point of view, the radius of curvature R4 is preferably 30 mm or larger and more preferably 40 mm or larger, and is preferably 70 mm or smaller and more preferably 60 mm or smaller.

Shoulder sub grooves 21 are preferably provided between shoulder lateral grooves that are adjacent with each other in the tire circumferential direction. The shoulder sub grooves 21 each have an outer end that is communicated with the axially outer end edge 13o of the shoulder land portion 13, and has a length that is shorter than that of the shoulder lateral grooves 18. This uniformizes the rigidity of the shoulder land portion 13 to further improve the wandering performance of the tire.

Figure 6:
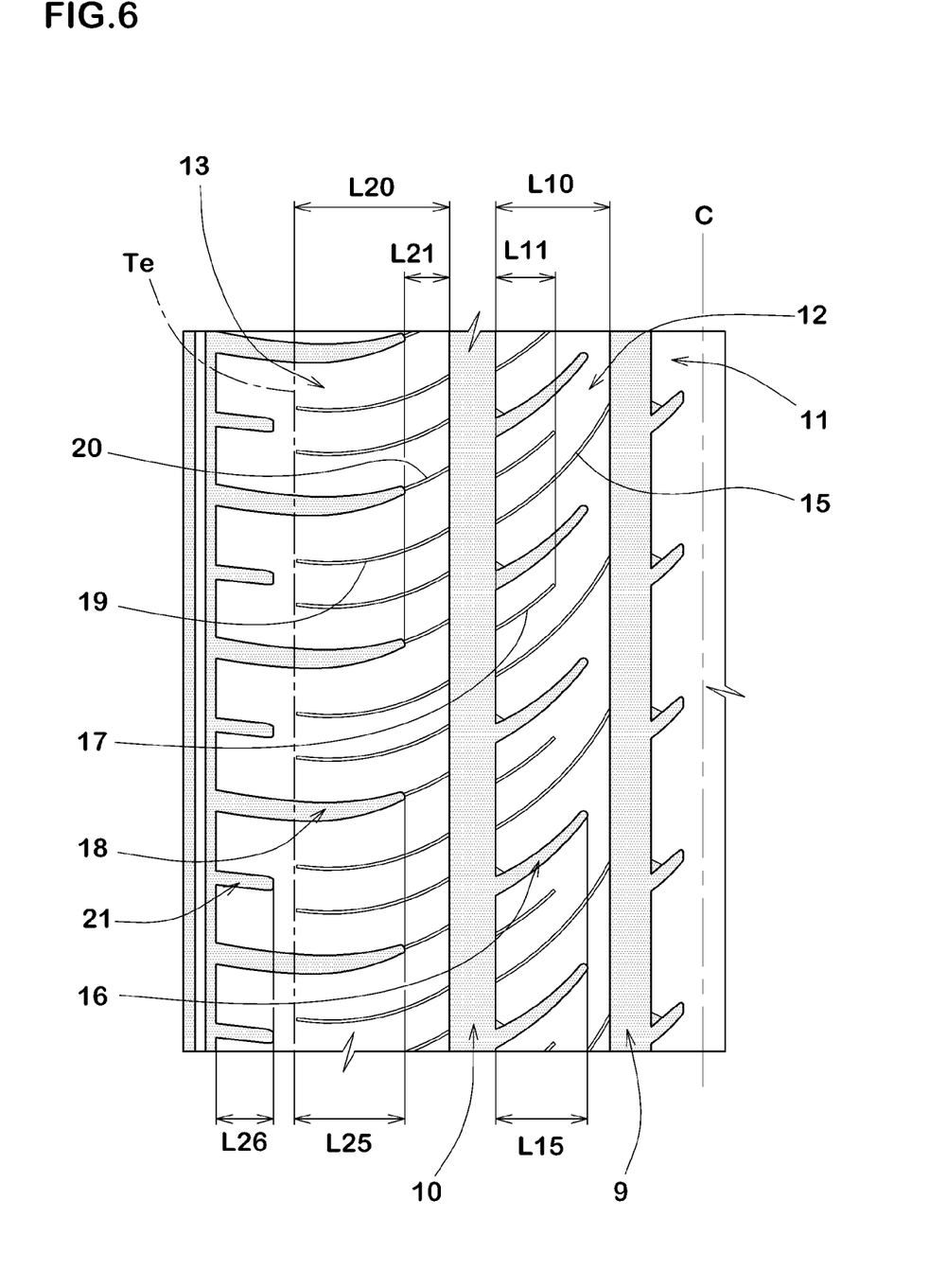
FIG. 6 is a developed view of the tread portion shown in FIG. 1.

FIG. 6 is an enlarged developed view of the left of the tread portion 2. In the pneumatic tire 1 according to the present embodiment, for the purpose of improving the wear resistance performance without deterioration of the wet performance and the steering stability, the edge length of the first middle sipes 15, the second middle sipes 17, the shoulder sipes 19, and the shoulder auxiliary sipes 20 with respect to the edge length of the middle lateral grooves 16, the shoulder lateral grooves 18 and the shoulder sub grooves 21 are determined as follows.

In this embodiment, the dimensions of the sipes and the lateral grooves are determined such that a ratio Ems/Ema is set smaller than a ratio Ess/Esa. Ems denotes a total of elements of the edge lengths, in the axial direction of the tire, of the middle sipes in the middle land portion 12. Ema denotes a total of elements of the edge lengths, in the axial direction of the tire, of the middle sipes and the middle lateral grooves in the middle land portion 12. Ess denotes a total of elements of the edge lengths, in the axial direction of the tire, of the shoulder sipes in the shoulder land portion 13. Esa denotes a total of elements of the edge lengths, in the axial direction of the tire, of the shoulder sipes and the shoulder lateral grooves in the shoulder land portion 13.

The total Ems of the elements of the edge lengths of the middle sipes in the axial direction of the tire is represented by Ems=ΣL10+ΣL11. As shown in FIG. 6, L10 is an element of the edge length of the first middle sipes 15 in the axial direction of the tire, and L11 is an element of the edge length of the second middle sipes 17 in the axial direction tire. Here, "Σ" indicates a sum of the elements of all the edge lengths in the axial direction of the tire over the entire circumferential direction of the tire (which applies in the description that follows). In obtaining the sum of the elements of the edge lengths of the sipes in the axial direction, two edges opposed with each other over a corresponding sipe is calculated.

The total Emg of the elements of the edge length of the middle lateral grooves 16 in the axial direction is represented by Emg=ΣL5. L15 is an element of the edge length of the middle lateral groove 16 in the axial direction. In obtaining the sum of the elements of the edge lengths of the lateral grooves in the axial direction, two edges opposed with each other over a corresponding groove is calculated.

Therefore, the total Ema of the elements of the edge lengths of the middle sipes and the middle lateral grooves (elements of all the edge lengths in the axial direction of the tire) in the axial direction in the middle land portion 12 is represented by Ema=Ems+Emg. It should be noted that if the crown main groove 9 and the shoulder main groove 10 are waved in a zigzag pattern, an extra edge length in the axial direction can be arbitrarily added.

Similarly, the total Ess of the elements of the edge lengths of the shoulder sipes in the axial direction is represented by Ess=ΣL20+ΣL21. L20 is an element of the edge length of the shoulder sipes 19 in the axial direction. L21 is an element of the edge length of the shoulder auxiliary sipes 20 in the axial direction.

The total Esg of the elements of the edge lengths of the shoulder lateral grooves in the axial direction is represented by Esg=ΣL25+ΣL26. L25 is an element of the edge length of the shoulder lateral grooves 18 in the axial direction. L26 is an element of the edge length of the shoulder sub groove 21 in the axial direction.

Therefore, the total Esa of the elements of the edge lengths of the shoulder sipes and the shoulder lateral grooves in the axial direction (element of all the edge lengths in the axial direction) in the shoulder land portion 13 is represented by Esa=Ess+Esg. It shoulder be noted that the shoulder sub grooves 21 disposed axially outside of the ground edge Te do not contact the ground in most cases. Therefore, in the calculation of the total of elements of Esg of the edge lengths of the shoulder grooves, the element L26 of the edge length of the shoulder sub grooves 21 in the axial direction is excluded from consideration. If the shoulder sub grooves 21 are elongate to axially inner side of the ground edge Te, the element L26 of the edge length of the shoulder sub groove 21 in the axial direction may be included into consideration.

According to the pneumatic tire 1 in the embodiment having the above-described configuration, the ratio Ems/Ema is set to be smaller than the ratio Ess/Esa, so that the ratio of the sipe edges with respect to all the edges in the middle land portion 12 is smaller than the ratio of the sipe edges with respect to all the edges in the shoulder land portion 13. This increases the ratio of the sipes with respect to all the edges from the shoulder land portion 13 to the middle land portion 12. Here, Ems denotes a total of the elements of edge lengths of the middle sipes in the axial direction in the middle land portion 12, while Ema denotes a total of the elements of edge lengths of the middle sipes and the middle lateral grooves in the axial direction in the middle land portion 12. Ess denotes a total of the elements of the edge lengths of the shoulder sipes in the axial direction in the shoulder land portion 13, while Esa denotes a total of the elements of the edge lengths of the shoulder sipes and the shoulder lateral grooves in the axial direction in the shoulder land portion 13. This increases the ground contact area in the shoulder land portion 13. This, in turn, improves the wet performance and the steering stability, and eliminates or minimizes wear of the shoulder land portion 13. This enhances the wear resistance of the tire.

At the time of braking, a force in the front-rear direction generated in the tread portion 2 acts to close the first middle sipes 15, the second middle sipes 17, the shoulder sipes 19, and the shoulder auxiliary sipes 20 to allow the block portions divided by the sipes and are adjacent with one another to contact and support with one another. This improves the rigidity of the block portions. This effect can be more effectively obtained in the shoulder land portion 13, where the ratio of the sipe edges with respect to all the edges is large. Similarly, a sufficiently large ground contact surface is ensures in the shoulder areas with a low ground contact pressure to improve the wear resistance while improving the wet performance and the steering stability.

The crown lateral grooves 14, the middle lateral grooves 16, and the shoulder lateral grooves 18 and the shoulder sub grooves 21 are not entirely passed through the respective crown land portion 11, the middle land portion 12, and the shoulder land portion 13 in the axial direction. This retains the rigidity of each land portion, and further improves the rigidity of each land portion in cooperation with improved rigidity by the above-described mutual support of the adjacent block portions. This, in turn, enhances the wear resistance of the tire.

The above-described advantageous effect improves the wet performance and the steering stability of the tire. This ensures that with an increased content of butadiene rubber in the tread rubber, the wear resistance of the tire further improves.

In order to obtain a high level of the wet performance and the steering stability as well as the wear resistance, the pneumatic tire 1 according to the embodiment is designed such that the relationship between the total edge length Es of the sipes and the total length Ea of all the edges in the tread portion 2 is optimized. In the calculation of the total edge length Es of the sipes, two edges opposed with each other over the sipe are used. A similar manner of calculation is applied to the edge length of the main grooves and the lateral grooves.

Specifically, the total length (total edge length Es of the sipes) of the edge lengths of the first middle sipes 15, the second middle sipes 17, the shoulder sipes 19, and the shoulder auxiliary sipes 20 is set in a range of from 40% to 70% of the total edge length (total length Ea of all the edges) of the crown main grooves 9, the shoulder main grooves 10, the crown lateral grooves 14, the middle lateral grooves 16, the shoulder lateral grooves 18, the first middle sipes 15, the second middle sipes 17, the shoulder sipes 19, and the shoulder auxiliary sipes 20.

If the total edge length Es of the sipes is smaller than 40% of the total length Ea of all the edges, the ground contact area may be decreased and the edge effect by the end edges of the sipes might not be sufficiently obtained. On the contrary, if the total edge length Es of the sipes exceeds 70% of the total length Ea of all the edges, the drainage performance of the crown main grooves 9, the shoulder main grooves 10, the crown lateral grooves 14, the middle lateral grooves 16, and the shoulder lateral grooves 18 might decrease. In this embodiment, since the relationship between the total edge length Es of the sipes and the total length Ea of all the edges in the tread portion 2 is optimized, the wet performance and the steering stability as well as the wear resistance of the tire are obtained at a higher level.

As described above, the means for relatively increasing the total edge length Es of the sipes with respect to the total length Ea of all the edges is effective to provide improved wet performance and steering stability as well as wear resistance. However, the rigidity of each block portion tends to decrease and such block portion is likely to adversely affect the steering stability and the wear resistance. Therefore, in this embodiment, the number of repeated pattern pitches for forming the block portions is adjusted in response to the ratio Es/Ea of the total edge length Es of the sipes with respect to the total length Ea of all the edges. Such an arrangement can optimize the rigidity of the block portions.

Namely, in a pneumatic tire 1 in which the ratio of the total edge length Es of the sipe edges in response to the total length Ea of all the edges is within the above-described range, the number of the middle lateral grooves 16 in a single middle land portion 12 is preferably 56 to 72, and the number of the shoulder lateral grooves 18 in a single shoulder land portion 13 is preferably in a range of 56 to 72. If the number of the middle lateral grooves 16 and the shoulder lateral grooves 18 is smaller than 56, the water discharge effect of the grooves 16 and 18 might decrease. If the number of the middle lateral grooves 16 and the shoulder lateral grooves 18 exceed 72, the rigidity of the block portions sectioned by the middle lateral grooves 16 and the shoulder lateral grooves 18 might decrease. In this embodiment, the relationship between the ratio Es/Ea of the total edge length Es of the sipes with respect to the total length Ea of all the edges and the number of pattern pitches is properly adjusted. This optimizes the rigidity of the block portions and improves the steering stability and the wear resistance of the tire.

In this embodiment, the ratio of the sipe edges with respect to all the edges from the middle land portion 12 to the shoulder portion 13 increases so that the rigidity of each block portion in the shoulder land portion 13 is likely to decrease. In order to prevent the decrease of the rigidity, the number of the shoulder lateral grooves 18 disposed in a single shoulder land portion 13 is preferably set to be smaller than the number of the middle lateral grooves 16 disposed in a single middle land portion 12. Therefore, the number of pattern pitches in the shoulder land portion 13 is larger than the number of pattern pitches in the middle land portion 12. As described above, the adjustment of the number of pattern pitches in response to the ratio of the sipe edges in the middle land portion 12 and the shoulder land portion 13 restrains the deterioration of the rigidity of the block portions in the shoulder land portion 13. This provides improved steering stability and wear resistance of the tire.

Comparison Test

Pneumatic tires of 195/60R14 with the basic structure shown in FIG. 1 were experimentally manufactured based on the specification shown in Tables 1, 2-1, 2-2, 3-1, and 3-3 to test the wear resistance, steering stability, and wet-braking performance thereof. Ems/Ema and Ess/Esa in each tire in Tables 2-1 and 2-2 are the same as the specification in the embodiment 1 shown in Table 1. In each tire shown in Tables 3-1 and 3-2, the ratio of the total edge length of the sipes with respect to the total length of all the edges is the same as the specification in the Example 1 shown in Tables 2-1 and 2-2. The tire of a common specification is used in Example 1 through Tables 1, 2-1, 2-2, 3-1, and 3-2. The methods are as follows.

Wear Resistance Test

Test tires each mounted on a rim of 14×7J were installed to all of wheels of a passenger vehicle of 1,300 cc displacement under an inner pressure of 230 kPa, and the groove depth of the crown main grooves after 5,000 km of traveling was measured. With the test results that are indicated by an index with respect to Comparative Example 1 that is 100, a larger numeral value indicates better wear resistance.

Steering Stability Test

The test vehicle with a driver was made to travel on a test course of a dry asphalt road to evaluate by the senses of the driver the performances of steering response, rigidity feeling and gripping during a turn of the vehicle. With the test results that are indicated by an index with respect to Comparative Example 1 that is 100, a larger numeral value indicates better steering stability.

Wet Braking Performance Test

A test driver drove the test vehicle on a wet asphalt road covered with a depth of water of from 1.4 mm to 1.6 mm, and then suddenly braked at a speed of 60 km/hr to measure a braking distance. With the test results that are indicated by an index with respect to Comparative Example 1 that is 100, a larger numeral value indicates better braking performance.

TABLE 1

|  | Comparative example 1 | Comparative example 2 | Example 1 | Example 2 |
|---|---|---|---|---|
| Ratio (%) of total Ems of elements of edge lengths of middle sipes in the axial direction | 55 | 50 | 45 | 45 |
| Ratio (%) of total Emg of elements of edge lengths of middle grooves in the axial direction | 45 | 50 | 55 | 55 |
| Ratio (%) of total Ema of elements of edge lengths of all middle edges | 100 | 100 | 100 | 100 |
| Ems/Ema | 55 | 50 | 45 | 45 |
| Ratio (%) of total Ess of elements of edge lengths of shoulder sipes in the axial direction | 50 | 50 | 50 | 55 |

TABLE 1-continued

|  | Comparative example 1 | Comparative example 2 | Example 1 | Example 2 |
| --- | --- | --- | --- | --- |
| Ratio (%) of total Esg of elements of edge lengths of shoulder grooves in the axial direction | 50 | 50 | 50 | 45 |
| Ratio (%) of total Esa of elements of edge lengths of all shoulder edges in the axial direction | 100 | 100 | 100 | 100 |
| Ess/Esa | 50 | 50 | 50 | 55 |
| wear resistance (index) | 100 | 100 | 101 | 101 |
| Steering stability (index) | 99 | 100 | 101 | 102 |
| wet braking performance (index) | 100 | 100 | 101 | 101 |

TABLE 2-1

|  | Comparative example 1 | Comparative example 2 | Comparative example 3 | Comparative example 4 |
| --- | --- | --- | --- | --- |
| Ratio (%) of total edge lengths Es of sipes to total length Ea of all edges | 0 | 10 | 20 | 30 |
| Ratio (%) of total of edge lengths of grooves to total length Ea of all edges | 100 | 90 | 80 | 70 |
| Ratio (%) of total lengths Ea of all edges | 100 | 100 | 100 | 100 |
| wear resistance (index) | 100 | 100 | 100 | 99 |
| Steering stability | 100 | 100 | 99 | 99 |
| wet braking performance (index) | 100 | 101 | 102 | 103 |

TABLE 2-2

|  | Example 1 | Example 2 | Example 3 | Example 4 | Comparative example 5 | Comparative example 6 |
| --- | --- | --- | --- | --- | --- | --- |
| Ratio (%) of total edge lengths Es of sipes to total length Ea of all edges | 40 | 50 | 60 | 70 | 80 | 90 |
| Ratio (%) of total of edge lengths of grooves to total length Ea of all edges | 60 | 50 | 40 | 30 | 20 | 10 |
| Ratio (%) of total lengths Ea of all edges | 100 | 100 | 100 | 100 | 100 | 100 |
| wear resistance (index) | 99 | 99 | 98 | 98 | 98 | 97 |
| Steering stability | 99 | 98 | 98 | 98 | 97 | 97 |
| wet braking performance (index) | 104 | 105 | 105 | 104 | 103 | 102 |

TABLE 3-1

|  | Comparative example 1 | Comparative example 2 | Example 1 | Example 2 | Example 3 |
| --- | --- | --- | --- | --- | --- |
| Number of middle lateral grooves | 48 | 52 | 56 | 60 | 64 |
| Number of shoulder lateral grooves | 48 | 52 | 56 | 60 | 64 |
| wear resistance (index) | 100 | 100 | 100 | 99 | 99 |
| Steering stability (index) | 100 | 100 | 100 | 100 | 100 |
| wet braking performance (index) | 100 | 100 | 101 | 102 | 103 |

TABLE 3-2

|  | Example 4 | Example 5 | Example 6 | Comparative example 3 | Comparative example 4 |
| --- | --- | --- | --- | --- | --- |
| Number of middle lateral grooves | 68 | 72 | 68 | 76 | 80 |
| Number of shoulder lateral grooves | 68 | 72 | 64 | 76 | 80 |
| wear resistance (index) | 99 | 98 | 99 | 97 | 96 |
| Steering stability (index) | 100 | 99 | 100 | 99 | 98 |
| wet braking performance (index) | 103 | 103 | 103 | 103 | 104 |

As is clearly seen in Tables 1, 2-1, 2-2, 3-1, and 3-3, it is determined that the pneumatic tire according to the embodiment improves in the steering stability and the wet performance with no or minimized deterioration of the wear resistance as compared with Comparative Examples. This ensures that when the content of, for example, butadiene is increased in the tread rubber, the wear resistance of the tire significantly improves.

Obviously, numerous modifications and variations of the present invention are possible in light of the above teachings. It is therefore to be understood that within the scope of the appended claims, the invention may be practiced otherwise than as specifically described herein.

What is claimed is:

1. A pneumatic tire comprising:
a tread portion, the tread portion provided with a pair of circumferentially and continuously extending crown main grooves each disposed on both sides of a tire equator and a pair of circumferentially and continuously extending shoulder main grooves disposed axially outside the crown main groove to form a crown land portion disposed between the pair of crown main grooves, a pair of middle land portions each disposed between the crown main groove and the shoulder main groove on each side of the tire equator, and a pair of shoulder land portions each disposed axially outside the shoulder main groove on each side of the tire equator,
the crown land portion being provided with a plurality of crown lateral grooves each extending from the crown main groove toward the tire equator without entirely passing through the crown land portion,
each of the middle land portions being provided with a plurality of middle lateral grooves each extending from the shoulder main groove toward the crown main groove without entirely passing through the middle land portion and a plurality of middle sipes arranged between circumferentially adjacent middle lateral grooves,
the middle sipes comprising a first middle sipe extending entirely across the middle land portion and a second middle sipe extending partially across the middle land portion, the first middle sipe communicating directly with the crown main groove, wherein an overlapped distance (L4) between an axially inner end of the first middle sipe and an axially outer end of one of the circumferentially adjacent middle lateral grooves in a circumferential direction of the tire is greater than an overlapped distance (L5) between an axially outer end of the first middle sipes and an axially inner end of the other one of the circumferentially adjacent middle lateral grooves in the circumferential direction of the tire, and
each of the shoulder land portions being provided with a plurality of shoulder lateral grooves each extending axially inward from a tread edge without entirely passing through the shoulder land portion, and a plurality of shoulder sipes each arranged between the circumferentially adjacent shoulder lateral grooves,
wherein a ratio Ems/Ema is smaller than a ratio Ess/Esa, where Ems denotes a total of elements of edge lengths of the middle sipes in an axial direction of the tire, Ema denotes a total of elements of edge lengths of the middle sipes and the middle lateral grooves in the axial direction of the tire, Ess denotes a total of elements of edge lengths of the shoulder sipes in the axial direction of the tire, and Esa denotes a total of elements of edge lengths of the shoulder sipes and the shoulder lateral grooves in the axial direction of the tire.

2. The pneumatic tire according to claim 1, wherein each of the middle sipes and the shoulder sipes has an arc-shape.

3. The pneumatic tire according to claim 1, wherein each angle of the middle sipes and the shoulder sipes with respect to a circumferential direction of the tire gradually increases toward its axially outer end from its axially inner end.

4. The pneumatic tire according to claim 1, wherein one of the shoulder land portions is further provided with a plurality of shoulder auxiliary sipes each communicating between an axially inner end of the shoulder lateral groove and the shoulder main groove.

5. The pneumatic tire according to claim 1, wherein a sipe is absent in the crown land portion.

6. The pneumatic tire according to claim 1, wherein a total edge length of the middle sipes and shoulder sipes is set in a range of from 40% to 70% of a total edge length of the crown main grooves, the shoulder main grooves, the crown lateral grooves, the middle lateral grooves, the shoulder lateral grooves, the middle sipes, and the shoulder sipes.

7. The pneumatic tire according to claim 1,
wherein a number of the middle lateral grooves in each middle land portion is in a range of from 56 to 72, and a number of the shoulder lateral grooves in each shoulder land portion is in a range of from 56 to 72.

8. The pneumatic tire according to claim 1, wherein a number of the shoulder lateral grooves in each shoulder land portion is smaller than a number of the middle lateral grooves in each middle land portions.

9. The pneumatic tire according to claim 1, wherein the crown lateral grooves and the shoulder lateral grooves are inclined in a same direction.

10. The pneumatic tire according to claim 1, wherein each of the crown main grooves and the shoulder main grooves extends straightly in the circumferential direction of the tire.

11. The pneumatic tire according to claim 1, wherein the overlap length (L4) and the overlap length (L5) are in a range of from 8% to 15% of placement pitches (P2) of the first middle sipes.

* * * * *